United States Patent
Deperraz et al.

(10) Patent No.: US 9,695,946 B2
(45) Date of Patent: Jul. 4, 2017

(54) ELECTRICALLY ACTUATED VALVE WITH A BALL SEALING ELEMENT

(75) Inventors: Nicolas Deperraz, Bons en Chablais (FR); Lionel Gandin, Geneva (CH); Michael Baumgartner, Morges (CH)

(73) Assignee: Fluid Automation Systems S.A., Versoix (CH)

( * ) Notice: Subject to any disclaimer, the term of this patent is extended or adjusted under 35 U.S.C. 154(b) by 387 days.

(21) Appl. No.: 12/866,925

(22) PCT Filed: Feb. 12, 2009

(86) PCT No.: PCT/EP2009/000984
§ 371 (c)(1),
(2), (4) Date: Aug. 10, 2010

(87) PCT Pub. No.: WO2009/106233
PCT Pub. Date: Sep. 3, 2009

(65) Prior Publication Data
US 2011/0005604 A1    Jan. 13, 2011

(30) Foreign Application Priority Data
Feb. 27, 2008 (FR) ..................... 08 51268

(51) Int. Cl.
| | | |
|---|---|---|
| *B05B 1/08* | (2006.01) | |
| *F16K 31/02* | (2006.01) | |
| *H02N 2/04* | (2006.01) | |
| *F16K 15/18* | (2006.01) | |
(Continued)

(52) U.S. Cl.
CPC ............. *F16K 1/14* (2013.01); *F16K 15/183* (2013.01); *F16K 31/004* (2013.01); *F16K 31/02* (2013.01); *Y10T 29/49412* (2015.01); *Y10T 137/0318* (2015.04)

(58) Field of Classification Search
CPC ........ F16K 1/14; F16K 15/183; F16K 31/004; F02M 69/041; F02M 27/08
USPC ......... 239/102.1, 102.2; 251/129.06, 129.14; 310/311, 328; 29/25.35
See application file for complete search history.

(56) References Cited

U.S. PATENT DOCUMENTS 3,804,329 A * 4/1974 Martner .............. B05B 17/0607
                                                          239/102.2
3,884,417 A * 5/1975 Sheffield et al. .......... 239/102.2
(Continued)

FOREIGN PATENT DOCUMENTS

FR    2264191 A    10/1975
GB    1534176 A    11/1978
(Continued)

*Primary Examiner* — Seth W Mackay-Smith
(74) *Attorney, Agent, or Firm* — The Ollila Law Group LLP

(57) ABSTRACT

A valve (100) including a housing (101) has a fluid inlet (102) and a fluid outlet (205). The valve (100) includes a vibrating element (206) adapted to vibrate when energized. The valve (100) also includes an amplifying plate (207) that is coupled to the vibrating element (106). The amplifying plate (207) includes a fluid passage (208). The fluid passage (208) provides fluid communication between the fluid inlet (102) and the fluid outlet (205). The valve (100) also includes a sealing ball (209) located between the fluid inlet (102) and the amplifying plate (207). The sealing ball (209) is adapted to seal the fluid passage (208).

22 Claims, 3 Drawing Sheets

(51) Int. Cl.
*F16K 1/14* (2006.01)
*F16K 31/00* (2006.01)

(56) References Cited

U.S. PATENT DOCUMENTS

| | | | | |
|---|---|---|---|---|
| 3,900,162 | A | * | 8/1975 | Titus ................. B41J 2/025 239/102.2 |
| 4,000,852 | A | | 1/1977 | Martin |
| 4,013,223 | A | | 3/1977 | Martin |
| 4,166,577 | A | * | 9/1979 | Elwell ............... F02M 69/041 239/102.2 |
| 4,605,167 | A | * | 8/1986 | Maehara ............ B05B 17/0646 239/102.2 |
| 4,702,418 | A | * | 10/1987 | Carter ................. A61L 9/14 239/101 |
| 5,152,456 | A | * | 10/1992 | Ross ................. A61M 15/0085 128/200.16 |
| 5,487,378 | A | * | 1/1996 | Robertson ......... A61M 15/0065 128/200.14 |
| 6,230,738 | B1 | | 5/2001 | Watanabe et al. |
| 6,279,872 | B1 | * | 8/2001 | Neuhaus .................. F02K 7/06 251/129.06 |
| 6,805,303 | B2 | * | 10/2004 | Hess ................... B05B 17/0646 239/102.1 |
| 8,264,123 | B2 | * | 9/2012 | Inoue ................... F04B 43/046 310/316.01 |
| 9,108,211 | B2 | * | 8/2015 | Ivri .................... B05B 17/0646 |
| 2003/0226906 | A1 | * | 12/2003 | Ivri ..................... A61M 11/005 239/102.2 |
| 2004/0041111 | A1 | * | 3/2004 | Boecking ................ 251/129.06 |

FOREIGN PATENT DOCUMENTS

| | | | |
|---|---|---|---|
| GB | 2023724 A | * | 1/1980 |
| WO | WO 2006127181 A2 | * | 11/2006 ......... B05B 17/0646 |

* cited by examiner

ELECTRICALLY ACTUATED VALVE WITH A BALL SEALING ELEMENT

TECHNICAL FIELD

The present invention relates to an electrically actuated valve, and more particularly, to an electrically actuated valve with a free moving sealing ball.

BACKGROUND OF THE INVENTION

Fluid handling devices are becoming increasingly popular and there is an increased demand for fluid handling devices which are both portable and easy to use. Portable fluid handling devices are being used for applications such as home care, point of care testing, fuel cells, fragrance dispensers, etc. In order for a portable fluid handling device to be effective and efficient, it must be light weight, small in size, consume minimal power, and be cost effective to manufacture. In many applications, it is also important that the fluid handling device provide an accurate and consistent fluid distribution. Therefore, it is necessary to incorporate an efficient fluid valve in the fluid handling device. In many aspects, the fluid valve characterizes the device's efficiency.

One solution of a portable valve that attempts to meet the above criteria is a miniature solenoid valve. The miniature solenoid valve however, is not as effective as originally anticipated. Solenoid valves however, are limited in both size as well as power consumption. In order to obtain adequate performance, a solenoid valve typically consumes a substantial amount of power. The power consumption of a solenoid valve, in some circumstances, is unacceptable when using batteries as a power source.

Another solution has been the use of electrically actuated piezo valves. Some piezo valves operate using a closing arm that seals against a sealing shoulder when the piezo element is de-activated. These valves typically require a substantial amount of space to operate and may not always provide an adequate solution as they are subject to clogging when used with liquids that may dry around the orifice. However, it is also known in the art to provide a sealing ball, which seals against a sealing shoulder.

For example, U.S. Pat. No. 6,142,394 discloses a fuel injector that uses a ball and pin valve. A piezo stack is in contact with a valve pin. Once the piezo stack is activated, the valve pin pushes a ball between a first and second seat thereby sealing against the second seat. The problem with this solution is that it relies on the valve pin operating correctly and maintaining contact with the ball. Furthermore, this solution faces the same challenges with clogging as piezo valves with closing arms.

U.S. Pat. No. 4,000,852 provides a similar solution. The '852 patent discloses a piezo valve with a ball sealing element held against a valve shoulder using a biasing device such as a spring. In this case, the piezo element is vibrated in an attempt to overcome the force of the spring and vibrate the ball away from the valve shoulder, thus, opening a fluid passage. However, the vibration created by the piezo element vibrates the entire valve, which requires excessive power consumption because a substantial amount of the vibration is dissipated throughout the valve. Additionally, the vibration must be great enough to overcome both the biasing device and the pressure provided by the incoming fluid.

FR 2,264,191 attempts to improve upon the '852 patent by removing the biasing device. Therefore, the fluid pressure holds the ball against the valve shoulder when the valve is deactivated. However, like the '852 patent, the piezo element acts on the entire valve, which can consume an unnecessarily high amount of power.

There is a need in the art to provide an electrically actuated valve that consumes a minimum amount of power and requires no power when deactivated. The present invention overcomes these and other problems and an advance in the art is achieved.

Aspects

In one aspect of the invention, a valve (100) including a housing (101) with fluid inlet (102) and a fluid outlet (205), the valve (100) comprising:
- a vibrating element (206) adapted to vibrate when energized;
- an amplifying plate (207) coupled to the vibrating element (206), the amplifying plate (207) including a fluid passage (208) providing fluid 25 communication between the fluid inlet (102) and the fluid outlet (205); and
- a sealing ball (209) located between the fluid inlet (102) and the amplifying plate (207), the sealing ball (209) adapted to seal the fluid passage (208).

Preferably, the vibrating element comprises a piezoelectric material.

Preferably, the vibrating element comprises a piezoelectric ceramic.

Preferably, the valve further comprises an electrode adapted to electrically couple a power source to the vibrating element.

Preferably, the sealing ball seals the fluid passage when the vibrating element is not energized.

Preferably, the fluid inlet is adapted to receive a pressurized fluid and the pressurized fluid retains the sealing ball against the fluid passage when the vibrating element is not energized.

Preferably, the amplifying plate comprises a metallic plate.

Preferably, the amplifying plate amplifies a vibration produced by the vibrating element.

Preferably, the valve further comprises a sealing member coupled to the amplifying plate and adapted to prevent the fluid flowing through the valve from contacting the vibrating element.

In one aspect of the invention, a method of forming a valve including a housing having a fluid inlet and a fluid outlet, comprising the steps of:
- positioning a vibrating element in the valve housing, the vibrating element adapted to vibrate when energized;
- coupling an amplifying plate to the vibrating element, the amplifying plate including a fluid passage providing fluid communication between the fluid inlet and the fluid outlet; and
- placing a sealing ball between the fluid inlet and the amplifying plate such that the sealing ball can seal the fluid passage.

Preferably, the vibrating element comprises a piezoelectric material.

Preferably, the vibrating element comprises a piezoelectric ceramic.

Preferably, the method further comprises the step of coupling an electrode to the vibrating element and to a power source.

Preferably, the sealing ball seals the fluid passage when the vibrating element is not energized.

Preferably, the fluid inlet is adapted to receive a pressurized fluid and the pressurized fluid retains the sealing ball against the fluid passage when the vibrating element is not energized.

Preferably, the amplifying plate comprises a metallic plate.

Preferably, the method further comprises the step of coupling the amplifying plate to the vibrating element such that the amplifying plate amplifies a vibration produced by the vibrating element.

Preferably, the method further comprises the step of coupling a sealing member to the amplifying plate such that a fluid flowing through the valve is prevented from contacting the vibrating element.

In one aspect of the invention, a method of controlling a fluid flow using a valve including a housing with a fluid inlet and a fluid outlet:

the valve comprising:
   a vibrating element adapted to vibrate when energized;
   an amplifying plate coupled to the vibrating element, the amplifying plate including a fluid passage providing fluid communication between the fluid inlet and the fluid outlet; and
   a sealing ball located between the fluid inlet and the amplifying plate, the sealing ball adapted to seal the fluid passage;
the method comprising the steps of:
   coupling the fluid inlet to a pressurized fluid source such that the pressurized fluid retains the sealing ball against the fluid passage; and
   energizing the vibrating element sufficiently to overcome the pressure applied on the sealing ball, thereby unsealing the fluid passage.

Preferably, the vibrating element comprises a piezoelectric material.

Preferably, the vibrating element comprises a piezoelectric ceramic.

Preferably, the amplifying plate comprises a metallic plate.

Preferably, the step of energizing the vibrating element further comprises the step of energizing the vibrating element at a resonant frequency of the system.

Preferably, the method further comprises the step of de-energizing the vibrating element, wherein the pressurized fluid again retains the sealing ball against the fluid passage.

DETAILED DESCRIPTION OF THE INVENTION

Figure 1:
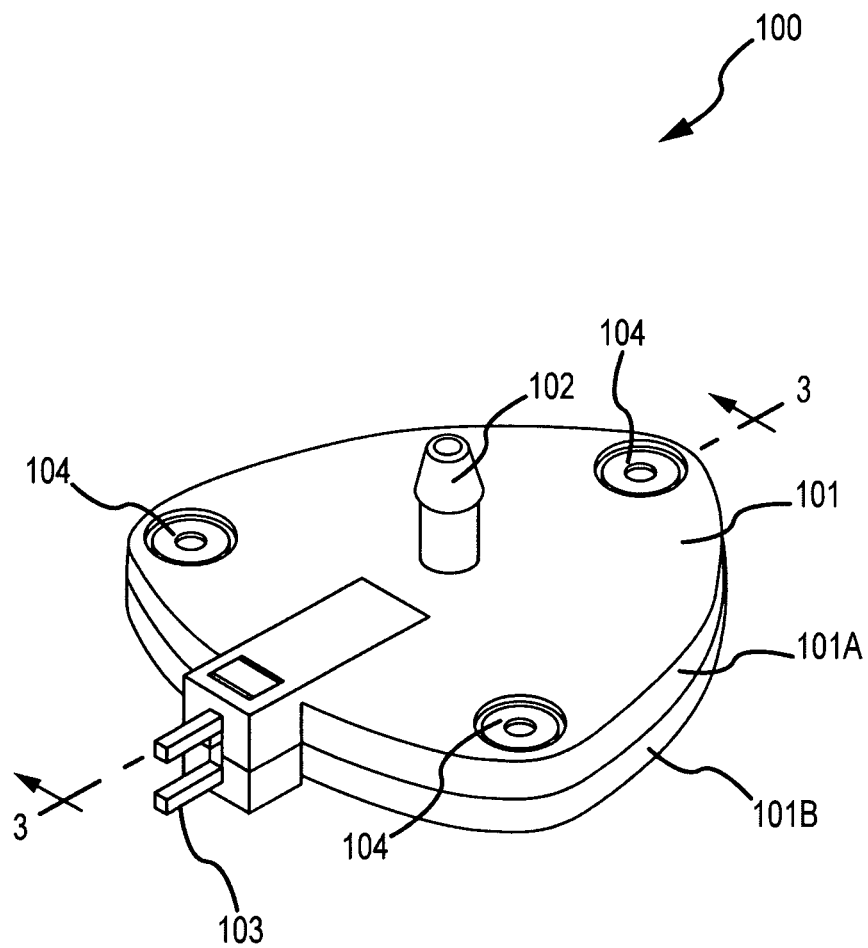
FIG. 1 shows a valve according to an embodiment of the invention.
Figure 2:
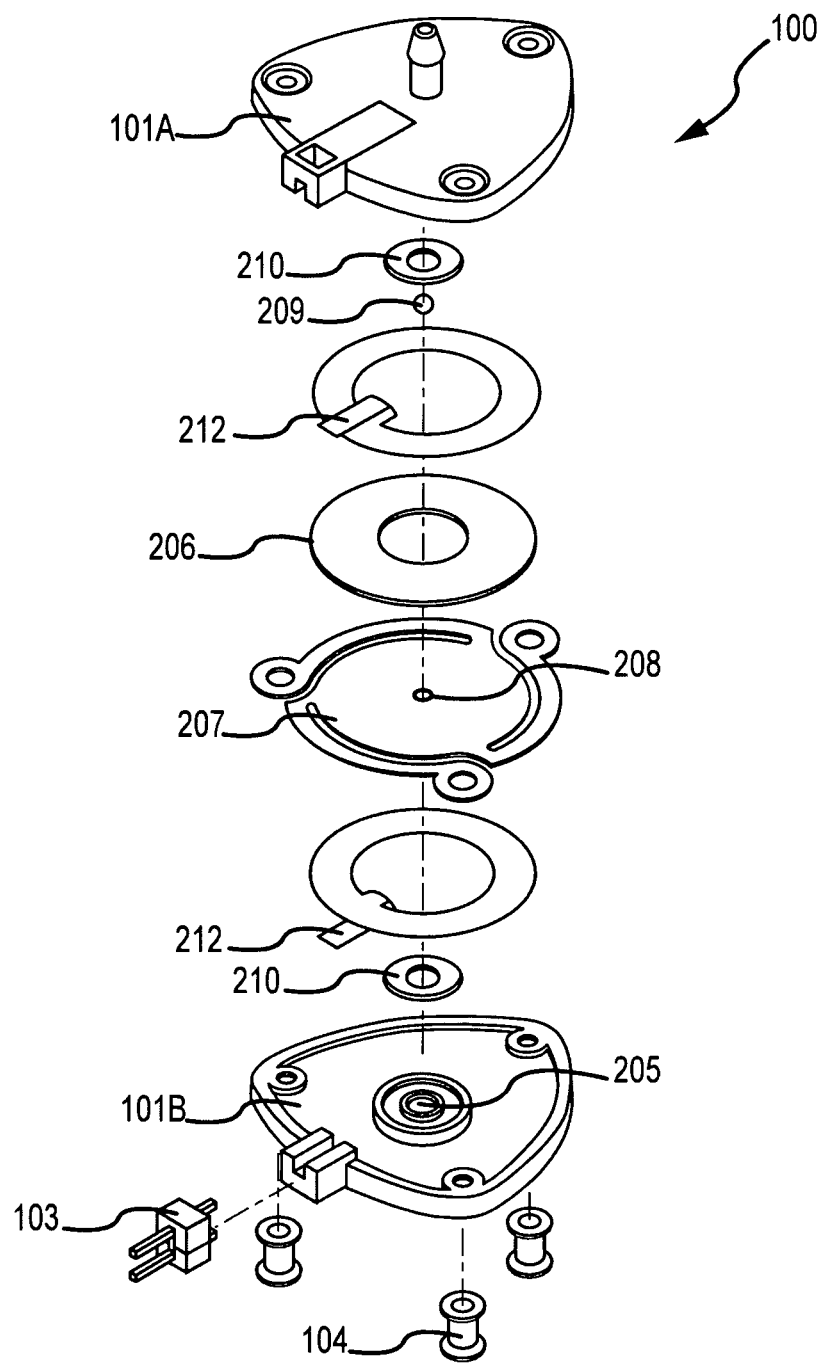
FIG. 2 shows an exploded view of the valve according to an embodiment of the invention.
Figure 3:
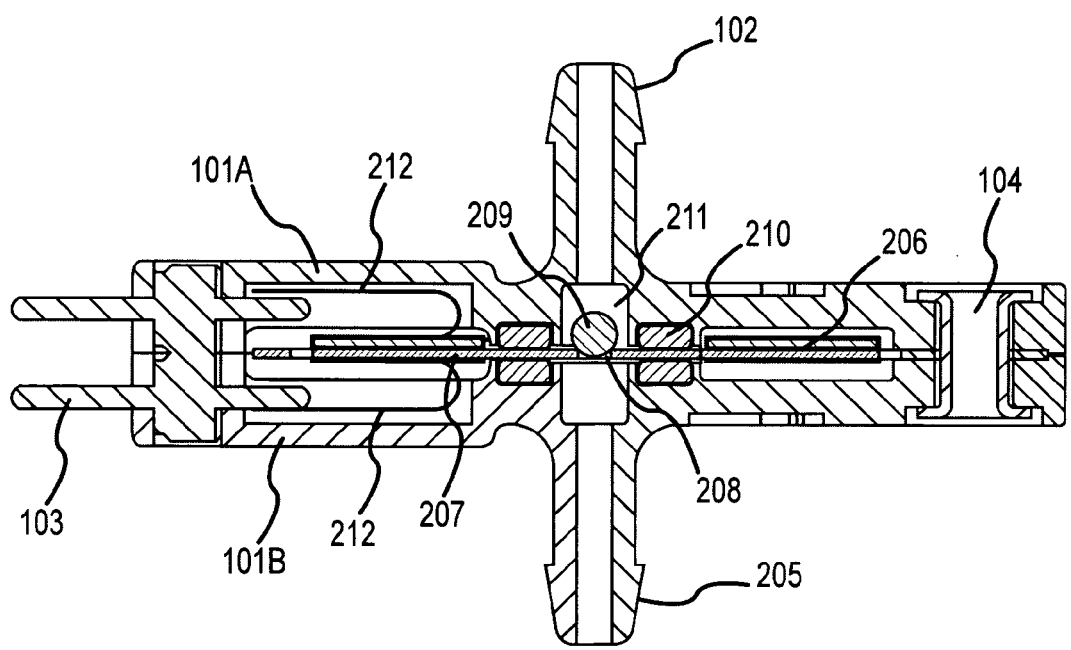
FIG. 3 shows a cross-sectional view of the valve according to an embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 shows a valve 100 according to an embodiment of the invention. The valve 100 is optimally sized to be used with a portable fluid delivery device (not shown). However, the valve 100 can also be used in other applications and the scope of the invention should not be limited to use with portable fluid delivery devices. The valve 100 can advantageously control the delivery of fluid (liquid, gas, or a combination thereof).

The valve 100 includes a housing 101, a fluid inlet 102, and one or more electrical contacts 103. According to an embodiment of the invention, the housing 101 comprises two or more portions. In the embodiment shown, the housing 101 comprises a top portion 101A and a bottom portion 101B. According to an embodiment of the invention, the housing 101 comprises two or more portions in order to access the internal components of the valve 100. In the embodiment shown, the two housing portions 101A and 101B are held together using a plurality of rivets 104. However, it should be understood that the housing portions 101A, 101B may be held together in any known manner including, but not limited to, adhesives, bonding, brazing, welding, snaps etc. The particular method employed to hold the two housing portions 101A, 101B together is not important for the purposes of the invention and therefore should not limit the scope of the invention. Furthermore, it should be understood that while only two housing portions are shown, other embodiments utilize more than two housing portions.

The fluid inlet 102 is shown as being formed in the top portion 101A of the housing 101. However, it should be understood that the fluid inlet 102 could alternatively be formed in the bottom portion 101B or any other portion of the valve 100 as the position of the fluid inlet 102 shown is merely one embodiment of the invention. The fluid inlet 102 is adapted to couple a pressurized fluid source (not shown). The fluid inlet 102 may be coupled directly to the pressurized fluid source or alternatively, be coupled using a fluid delivery apparatus such as a fluid hose or other tubing. The valve 100 is designed to control the flow of the pressurized fluid from the pressurized fluid source by entering the valve 100 through the fluid inlet 102 and exiting through the fluid outlet 205 (See FIG. 2). While the fluid inlet 102 is shown as extending from the housing 101, it should be understood that in other embodiments, the fluid inlet 102 comprises an aperture capable of accepting a pressurized fluid.

The valve 100 also includes one or more electrical contacts 103. The electrical contacts 103 are provided to electrically couple the valve 100 to an external power source (not shown). The external power source may comprise an electrical outlet, or alternatively, may comprise a battery or a plurality of batteries. The use of the electrical contacts 103 is discussed further below.

FIG. 2 shows an exploded view of the valve 100 according to an embodiment of the invention. FIG. 2 shows some of the internal components of the valve 100 according to an embodiment of the invention. As shown, the valve 100 includes an outlet 205. The outlet 205 is provided in the bottom housing portion 101B in the embodiment shown, but the fluid outlet 205 could be provided in the top portion 101A of the housing.

The valve 100 also includes a vibrating element 206, an amplifying plate 207 with fluid passage 208, and a sealing ball 209. The vibrating element 206 is capable of vibrating when energized, i.e., when exposed to an electric field or an electric potential. In the embodiment shown in FIG. 2, the vibrating element 206 is disk shaped, however, it should be understood that other shapes may be used. According to an embodiment of the invention, the vibrating element 206 comprises a piezoelectric material. In some embodiments, the piezoelectric material comprises a piezoelectric ceramic. Piezoelectric ceramics are known in the art and are often used for their physical characteristics when energized by an alternating electric field. If an alternating electric field is applied to a piezoelectric ceramic, the element changes dimensions at the frequency of the electric field. Therefore, the piezoelectric ceramic converts electrical energy into mechanical energy. If the electric field applied is at the resonance frequency of the system, the element will vibrate most efficiently.

Although piezoelectric ceramics provide an efficient material for the present application, it should be understood that other materials that can vibrate when energized may be used. Therefore, the present invention should not be limited to the use of piezoelectric ceramics. In some embodiments, the vibrating element 206 should however, be capable of vibrating when energized with relatively low voltage. According to one embodiment of the invention, the vibrating element 206 is powered using an H-bridge using a low DC voltage, for example about 24 volts. However, other configurations and voltages are contemplated and are within the scope of the invention. According to an embodiment of the invention, the vibrating element 206 is coupled to the amplifying plate 207. The amplifying plate 207 can be provided to amplify the vibrations induced by the vibrating element 206. In some embodiments, for example when the vibrating element 206 comprises a piezoelectric ceramic, the vibrations produced may not be sufficient based on the fluid being delivered. The amplifying plate 207 can be provided to increase the vibrations applied to the sealing ball 209. The amplifying plate 207 can also provide a separation between the fluid and the vibrating element 206. In some circumstances, the fluid being delivered may adversely affect the life and/or performance of the vibrating element 206 and therefore, it is necessary to prevent the fluid from contacting the vibrating element 206. Therefore, sealing members 210, such as O-rings may be provided to seal off the fluid and prevent exposure to the vibrating element 206. In order to transmit the vibration in an efficient way from vibrating element 206 to the sealing ball 209, the sealing member 210 should be preferably made of soft elastomere and placed in an area where there is no axial displacement (area called nodal points) or at least where the displacement is minimal. However, it should be understood that other materials may be used.

It should be understood that other sealing members 210 may be provided, and the invention does not need to use O-rings.

In one embodiment of the invention, the vibrating element 206 is substantially permanently coupled to the amplifying plate 207, such as by adhesives, bonding, brazing, welding etc. In other embodiments, the vibrating element 206 may simply be in contact with the amplifying plate 207, but not permanently coupled. In yet other embodiments, the vibrating element 206 is coupled to the amplifying plate 207 using one or more intermediate components that physically separate the vibrating element 206 from the amplifying plate 207. However, in order to achieve maximum transfer of energy from the vibrating element 206 to the amplifying plate 207, the two should be contacting one another.

The valve 100 also includes electrodes 212. While two electrodes 212 are shown, it should be understood that some embodiments include only one electrode 212, while other embodiments include more than two electrodes 212. The electrodes 212 are provided for energizing the vibrating element 206. In the embodiment shown, one electrode 212 is placed above the vibrating element 206, with the other placed below the amplifying plate 207. When the electrodes 212 are configured as shown, it is necessary that the amplifying plate 207 be able to conduct electricity. Therefore, the amplifying plate 207 in this embodiment may comprise a metallic material, such as for example, stainless steel. Stainless steel is both electrically conductive, and in many circumstances able to withstand corrosion caused by the fluid being delivered. Other conductive materials may however, be suitable depending on the anticipated delivered fluid. The electrodes 212 are also coupled to the electrical connector 103, which then communicates with a power source (not shown) capable of driving the vibrating element 206 at the resonance frequency.

FIG. 3 shows a cross-sectional view of the valve 100 taken along line 3-3 of FIG. 1. The valve 100 shown in FIG. 3 is in a sealed state, meaning if connected to a pressurized fluid source, the fluid cannot flow from the fluid inlet 102 to the fluid outlet 205. When the fluid inlet 102 is coupled to a pressurized fluid source, the pressure of the fluid acts within the pressure chamber 211 and forces the sealing ball 209 against the fluid passage 208 formed in the amplifying plate 207. The fluid passage 208 formed in the amplifying plate 207 is advantageously sized such that the sealing ball 209 is capable of substantially sealing the fluid passage 208. Thus, when the vibrating element 206 is not vibrating, the only force acting on the sealing ball 209 is the pressure of the fluid, which retains the sealing ball 209 in a sealed position. As can be seen, the fluid outlet 205 is sealed off from the fluid inlet 102 and thus, no fluid exits the valve 100. Although no sealing member is shown, the fluid passage 208 may include a sealing member to increase the sealing capabilities of the valve. While the valve 100 shown only includes one outlet 205, it should be understood that in alternative embodiments, the valve 100 includes multiple outlets. Therefore, the sealing ball 209 may seal one fluid outlet while allowing fluid to exit another fluid outlet.

When fluid is desired at the fluid outlet 205, the vibrating element 206 is energized. As can be seen, the electrical connector 103 is coupled to the electrodes 212. The electrodes 212 are also electrically coupled to the vibrating element 206 and the amplifying plate 207. Therefore, when energized, the vibrating element 206 begins to vibrate. According to an embodiment of the invention, the vibrating element 206 is energized at the resonant frequency of the system. This resonance frequency may be based on the valve 100 as a whole, or alternatively, it may be based on the resonant frequency of the vibrating element 206 and the amplifying plate 207. According to an embodiment of the invention, the valve 100 can provide a feedback for a parameter setup. The parameter setup can adjust the frequency, the fluid flow rate, etc. Additionally, the parameter setup can configure the valve 100 to regulate the parameters set by a user of the valve 100.

The vibrations are transmitted and amplified by the amplifying plate 207. Because the amplifying plate 207 vibrates, any fluid that has dried on the amplifying plate 207 around the fluid passage 208 is likely to be broken off from the amplifying plate 207. This advantageously prevents the fluid passage 208 from clogging during periods of non-use. These vibrations only need to overcome the force of the pressurized fluid acting on the sealing ball 209 to cause the seal between the sealing ball 209 and the fluid passage 208 to break, thus allowing fluid to exit through the fluid outlet 205. The frequency and/or amplitude of the vibrations can be controlled in order to control energy supplied to the sealing ball 209, which in turn controls the flow of fluid through the valve 100. As soon as the energy supplied to the vibrating element 206 is removed, the vibrations cease and the pressurized fluid again forces the sealing ball 209 to seal against the fluid passage 208 stopping the fluid flow.

As shown, the valve 100 optimally limits the fluid exposure to the fluid inlet 102, pressure chamber 211, and fluid outlet 205. Therefore, the only internal components exposed to the fluid are the sealing ball 209, the sealing elements 210, and the amplifying plate 207. The sealing members 210 advantageously prevent fluid from reaching the vibrating element 206. This not only increases the life of the vibrating element 206, but also reduces the chance of an electrical shorts caused by the fluid reaching the electrodes 212.

As an alternative to the embodiment shown, the vibrating element 206 may be positioned outside of the housing 101. In this embodiment, the electrical connector 103 and the electrodes 212 may also be located outside of the housing 101. This would allow the sealing members 210 to be removed and also, the size of the housing 101 could be reduced.

The valve 100 provides an effective and efficient method for controlling fluid delivery, especially for portable use applications. The valve 100 is able to prevent fluid flow in the absence of power by using only the fluid pressure to seal the sealing ball 209 against the fluid passage 208. When energized, the vibrations caused by the vibrating element 206 can break apart dry pieces of fluid that may form around the fluid passage 208 during non-use. Controlling electric signal (i.e. frequency and/or amplitude) allows the proportional control of the flow through the valve 100.

Additionally, when fluid is delivered, the valve 100 minimizes power consumption by amplifying the vibrations using the amplifying plate 207. Therefore, the vibrations do not need to be sufficient to cause the entire valve to vibrate as in the prior art. Additionally, because the valve does not require a biasing device to retain the sealing ball 209 against the fluid passage 208, the force required to break the seal between the sealing ball 209 and the fluid passage 208 is reduced. When materials such as low voltage piezoelectric ceramics are used for the vibrating element 206, the power required to vibrate the vibrating element 206 is also kept to a minimum. The valve 100 thus provides a compact, low voltage fluid delivery apparatus with a minimum number of parts.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other electrically activated valves, and not just to the embodiments described above and shown in the accompanying figures. Accordingly, the scope of the invention should be determined from the following claims.

We claim:

1. A valve (100) including a housing (101) with a fluid inlet (102) and a fluid outlet (205), the valve (100) comprising:
    a vibrating element (206) adapted to vibrate when energized;
    an amplifying plate (207) coupled to the vibrating element (206), the amplifying plate (207) including a fluid passage (208) providing fluid communication between the fluid inlet (102) and the fluid outlet (205), wherein the amplifying plate (207) is configured to amplify vibrations of the vibrating element (206) and to transmit the amplified vibrations of the vibrating element (206) to the fluid passage (208); and
    a sealing ball (209) located between the fluid inlet (102) and the amplifying plate (207), the sealing ball (209) adapted to seal the fluid passage (208).

2. The valve (100) of claim 1, wherein the vibrating element (206) comprises a piezoelectric material.

3. The valve (100) of claim 1, wherein the vibrating element (206) comprises a piezoelectric ceramic.

4. The valve (100) of claim 1, further comprising an electrode (212) adapted to electrically couple a power source to the vibrating element (206).

5. The valve (100) of claim 1, wherein the sealing ball (209) seals the fluid passage (208) when the vibrating element (206) is not energized.

6. The valve (100) of claim 5, wherein the fluid inlet (102) is adapted to receive a pressurized fluid, and wherein the pressurized fluid retains the sealing ball (209) against the fluid passage (208) when the vibrating element (206) is not energized.

7. The valve (100) of claim 1, wherein the amplifying plate (207) comprises a metallic plate.

8. The valve (100) of claim 1, further comprising a sealing member (210) coupled to the amplifying plate (207) and adapted to prevent a fluid flowing through the valve (100) from contacting the vibrating element (206).

9. A method of forming a valve including a housing having a fluid inlet and a fluid outlet, comprising the steps of:
    positioning a vibrating element in the valve housing, the vibrating element adapted to vibrate when energized;
    coupling an amplifying plate to the vibrating element, the amplifying plate including a fluid passage providing fluid communication between the fluid inlet and the fluid outlet, wherein the amplifying plate is configured to amplify vibrations of the vibrating element and to transmit the amplified vibrations of the vibrating element to the fluid passage; and
    placing a sealing ball between the fluid inlet and the amplifying plate such that the sealing ball can seal the fluid passage.

10. The method of claim 9, wherein the vibrating element comprises a piezoelectric material.

11. The method of claim 9, wherein the vibrating element comprises a piezoelectric ceramic.

12. The method of claim 9, further comprising the step of coupling an electrode to the vibrating element and to a power source.

13. The method of claim 9, wherein the sealing ball seals the fluid passage when the vibrating element is not energized.

14. The method of claim 13, wherein the fluid inlet is adapted to receive a pressurized fluid, and wherein the pressurized fluid retains the sealing ball against the fluid passage when the vibrating element is not energized.

15. The method of claim 9, wherein the amplifying plate comprises a metallic plate.

16. The method of claim 9, further comprising the step of coupling a sealing member to the amplifying plate such that a fluid flowing through the valve is prevented from contacting the vibrating element.

17. A method of controlling a fluid flow using a valve including a housing with a fluid inlet and a fluid outlet:
the valve comprising:
    a vibrating element adapted to vibrate when energized;
    an amplifying plate coupled to the vibrating element, the amplifying plate including a fluid passage providing fluid communication between the fluid inlet and the fluid outlet, wherein the amplifying plate is configured to amplify vibrations of the vibrating element and to transmit the amplified vibrations of the vibrating element to the fluid passage; and
    a sealing ball located between the fluid inlet and the amplifying plate, the sealing ball adapted to seal the fluid passage;

the method comprising the steps of:
    coupling the fluid inlet to a pressurized fluid source such that the pressurized fluid retains the sealing ball against the fluid passage; and
    energizing the vibrating element sufficiently to overcome the pressure applied on the sealing ball, thereby unsealing the fluid passage.

18. The method of claim 17, wherein the vibrating element comprises a piezoelectric material.

19. The method of claim 17, wherein the vibrating element comprises a piezoelectric ceramic.

20. The method of claim 17, wherein the amplifying plate comprises a metallic plate.

21. The method of claim 17, wherein the step of energizing the vibrating element further comprises the step of energizing the vibrating element at a resonant frequency of the system.

22. The method of claim 17, further comprising the step of de-energizing the vibrating element, wherein the pressurized fluid again retains the sealing ball against the fluid passage.

* * * * *